US011441693B2

(12) United States Patent
Huynh

(10) Patent No.: US 11,441,693 B2
(45) Date of Patent: Sep. 13, 2022

(54) MANUAL OVERRIDE ASSEMBLY

(71) Applicant: DANFOSS POWER SOLUTIONS II TECHNOLOGY A/S, Nordborg (DK)

(72) Inventor: Tam Chi Huynh, Richfield, MN (US)

(73) Assignee: Danfoss Power Solutions II Technology A/S

( * ) Notice: Subject to any disclaimer, the term of this patent is extended or adjusted under 35 U.S.C. 154(b) by 371 days.

(21) Appl. No.: 16/444,479

(22) Filed: Jun. 18, 2019

(65) Prior Publication Data

US 2019/0301629 A1 Oct. 3, 2019

Related U.S. Application Data

(62) Division of application No. 15/307,678, filed as application No. PCT/US2015/028279 on Apr. 29, 2015, now Pat. No. 10,371,276.

(Continued)

(51) Int. Cl.
*F15B 13/10* (2006.01)
*F16K 31/05* (2006.01)
(Continued)

(52) U.S. Cl.
CPC .......... *F16K 31/05* (2013.01); *F15B 13/0402* (2013.01); *F15B 13/0814* (2013.01); *F15B 13/10* (2013.01); *F16K 11/07* (2013.01); *F16K 11/0708* (2013.01); *F16K 31/60* (2013.01); *F15B 2211/862* (2013.01);
(Continued)

(58) Field of Classification Search
CPC ................ F15B 13/10; F15B 2211/863; F15B 2211/862; F16K 11/0708; Y10T 137/87209; Y10T 137/87193
See application file for complete search history.

(56) References Cited

U.S. PATENT DOCUMENTS 1,094,998 A ‡ 4/1914 Jansson ................... F16K 35/14
137/596
3,906,980 A ‡ 9/1975 Hanser ................ F15B 13/0402
137/106
(Continued)

FOREIGN PATENT DOCUMENTS

CN 201486951 U ‡ 5/2010
CN 201486951 U 5/2010
(Continued)

OTHER PUBLICATIONS

International Search Report and Written Opinion of the International Searching Authority for International Patent Application No. PCT/US2015/028279 dated Jul. 21, 2015, 8 pgs.‡
(Continued)

*Primary Examiner* — Matthew W Jellett
*Assistant Examiner* — Christopher D Ballman
(74) *Attorney, Agent, or Firm* — Merchant & Gould P.C.

(57) ABSTRACT

A manual override assembly for a hydraulic power source operates to override an actuator of a hydraulic power source. The assembly includes a lever arm and connecting rods. The lever arm pivotally moves relative to a valve body of the hydraulic power source. The lever arm is connected to valve spools via the connecting rods, respectively. Each spool has a bore with an off-set opening for inserting one end of the connecting rod.

7 Claims, 19 Drawing Sheets

Related U.S. Application Data

(60) Provisional application No. 61/987,188, filed on May 1, 2014.

(51) Int. Cl.
    *F15B 13/08*     (2006.01)
    *F16K 11/07*     (2006.01)
    *F15B 13/04*     (2006.01)
    *F16K 31/60*     (2006.01)

(52) U.S. Cl.
    CPC ... *F15B 2211/863* (2013.01); *F15B 2211/895* (2013.01); *Y10T 137/87193* (2015.04); *Y10T 137/87209* (2015.04)

(56) References Cited

U.S. PATENT DOCUMENTS

| | | | | |
|---|---|---|---|---|
| 4,071,046 A | ‡ | 1/1978 | Cates | F15B 13/04 137/59 |
| 4,287,906 A | | 9/1981 | Green et al. | |
| 4,510,846 A | ‡ | 4/1985 | Gazzera | F15B 13/0405 137/106 |
| 4,627,468 A | ‡ | 12/1986 | Wilke | G05G 5/02 137/62 |
| 4,633,977 A | ‡ | 1/1987 | Holmes | B66F 11/044 187/24 |
| 4,757,840 A | | 7/1988 | Chmelar | |
| 4,827,982 A | ‡ | 5/1989 | Inagaki | F15B 13/0422 137/59 |
| 5,454,400 A | ‡ | 10/1995 | Rodgers | F15B 13/042 137/454.6 |
| 5,638,866 A | ‡ | 6/1997 | Mueller | F15B 13/0422 137/596 |
| 6,352,240 B1 | ‡ | 3/2002 | Eckstein | A61G 7/018 137/636.1 |
| 6,634,383 B2 | ‡ | 10/2003 | Aarestad | F15B 13/0422 137/636.1 |
| 8,905,072 B2 | ‡ | 12/2014 | Barnes | F16K 31/60 137/596.16 |
| 2013/0048893 A1 | ‡ | 2/2013 | Barnes | F16K 31/60 251/23 |

FOREIGN PATENT DOCUMENTS

| | | | | |
|---|---|---|---|---|
| CN | 101994728 A | ‡ | 3/2011 | |
| CN | 101994728 A | | 3/2011 | |
| CN | 201953735 U | ‡ | 8/2011 | |
| CN | 201953735 U | | 8/2011 | |
| CN | 202501041 U | ‡ | 10/2012 | |
| CN | 202501041 U | | 10/2012 | |
| DE | 3810273 A1 | ‡ | 10/1989 | F16K 31/602 |
| DE | 3810273 A1 | | 10/1989 | |
| GB | 2 061 386 A | ‡ | 5/1981 | F15B 13/10 |
| GB | 2 061 386 A | | 5/1981 | |

OTHER PUBLICATIONS

Extended European Search Report for corresponding European Patent Application No. 15785581.8 dated Apr. 24, 2018, 9 pages.‡
Extended European Search Report for Application No. 19191564.4 dated Nov. 26, 2019.

‡ imported from a related application

MANUAL OVERRIDE ASSEMBLY

CROSS-REFERENCE TO RELATED APPLICATION(S)

This application is a division of U.S. patent application Ser. No. 15/307,678, filed on Oct. 28, 2016, which is a U.S. National Stage of PCT/US2015/028279, filed on Apr. 29, 2015, which claims benefit of U.S. Patent Application Ser. No. 61/987,188 filed on May 1, 2014, and which applications are incorporated herein by reference. To the extent appropriate, a claim of priority is made to each of the above disclosed applications.

FIELD

The present disclosure relates to a manual override assembly that can be installed in a hydraulic power system. The present disclosure further relates to a spool and a retainer plug of the manual override assembly.

BACKGROUND

Twin spool valve assemblies are used in hydraulic power systems for controlling hydraulic fluid flow to work components such as hydraulic cylinders. A twin spool valve assembly can include first and second spools that are moved within corresponding spool bores of the valve assembly to alternatingly place corresponding first and second work ports of the of the valve assembly in fluid communication with either pump system pressure or tank pressure. In operation, a powered actuator (e.g., a solenoid arrangement, voice coil arrangement, pilot valve arrangement, etc.) can coordinate movement of the first and second spools within their corresponding spool bores such that when the first work port is in fluid communication with pump system pressure, the second work port is in fluid communication with tank pressure, and when the first work port is in fluid communication with tank pressure, the second pork port is in fluid communication with pump system pressure. The first and second work ports can be respectively coupled to first and second ports of a work component such that pump system pressure from the hydraulic power system can be used to drive movement of the work component.

US 2013/0048893 discloses an example twin spool valve assembly having a manual override for allowing the positions of the twin spools to be manually adjusted in the event of failure of the powered actuator. In this way, movement of the corresponding work component can be manually controlled in situations where the powered actuator is not operational.

Existing manual overrides can be subject to wear and can be relatively complicated in design (i.e., can include a relatively large number of separate parts that need to be assembled) thereby increasing manufacturing and installation costs. It would be beneficial to provide for a spool assembly and retainer plug assembly comprising fewer parts than the currently available assemblies. It would further be beneficial to provide for a spool assembly and retainer plug assembly that are more cost effective to manufacture and easier to assemble.

SUMMARY

The present disclosure relates to a hydraulic power source comprising a valve body defining a first spool bore and a second spool bore; a first spool disposed in the first spool bore and a second spool disposed in the second spool bore; an actuator for alternatingly moving the spools in a first direction and a second direction that is opposite of the first direction so that when one spool moves in the first direction, the other spool moves in the second direction; and a manual override assembly for overriding the actuator. The manual override assembly includes a lever arm pivotally movable relative to the valve body about a pivot axis, and a first connecting rod for connecting the lever arm to the first spool and a second connecting rod for connecting the lever arm to the second spool. The first and second connecting rods each include a spool engagement flange. The first and second connecting rods are connected to the lever arm on opposite sides of the pivot axis, wherein when the lever arm is pivoted about the pivot axis in a clockwise direction the first connecting rod is moved in the first direction and the second connecting rod is moved in the second direction, and when the lever is pivoted in a counterclockwise direction the first connecting rod is moved in the second direction and the second connecting rod is moved in the first direction. The first and second spools each include connecting rod bores for respectively receiving the first and second connecting rods. The first and second spools further include axial end faces that define bore access openings for providing access to the connecting rod bores, the bore access openings each including a first region and a second region laterally offset from the first region, the first regions being sized and shaped to allow insertion of the spool engagement flanges of the connecting rods therethrough, the second regions being sized and shaped to prevent the spool engagement flanges from passing therethrough. The first and second connecting rods are loaded into their respective connecting rod bores and thereby coupled with their corresponding first and second spools by inserting the spool engagement flanges through the first regions of the bore access openings and then sliding the connecting rods laterally into alignment with the second regions of the bore access openings such that the spool engagement flanges are captured within the spool bores.

The present disclosure further relates to a spool valve connection arrangement comprising a connecting rod including a rod retention element adjacent a first end of the connecting rod, and a valve spool including lands and at least one recess between the lands. The valve spool also defines an internal connecting rod bore positioned adjacent one end of the valve spool, where the valve spool includes an axial end face at the end of the valve spool, the axial end face defining a bore access opening including a first region and a second region laterally offset from the first region. The second region of the bore access opening is co-extensive with the connecting rod bore and the first region is at least partially laterally offset from the connecting rod bore. The first region of the bore access opening is sized and shaped to allow the first end of the connecting rod including rod retention element to be inserted therethrough. The second region of the bore access opening is sized and shaped to prevent the first end of the connecting rod including the retention element from being axially withdrawn from the connecting rod bore. The connecting rod is coupled to the end of the spool by inserting the first end of the connecting rod including the rod retention element through the first region of the bore access opening and then moving the connecting rod laterally from the first region of the connecting rod opening into the second region of the bore access opening.

The present disclosure further relates to a method for coupling a connecting rod to a valve spool. The connecting rod includes a rod retention element adjacent a first end of the connecting rod. The valve spool includes lands and at least one recess between the lands, the valve spool also defining an internal connecting rod bore positioned adjacent one end of the valve spool. The valve spool further includes an axial end face at the end of the valve spool, the axial end face defining a bore access opening including a first region and a second region laterally offset from the first region, the first region of the bore access opening being sized and shaped to allow the first end of the connecting rod including rod retention element to be inserted therethrough, the second region of the bore access opening being sized and shaped to prevent the first end of the connecting rod including the retention element from being withdrawn from the connecting rod bore. The valve spool is mounted within a spool bore of a valve body. The method comprises the steps of inserting the first end of the connecting rod including the rod retention element through the first region of the bore access opening; moving the connecting rod laterally from the first region of the connecting rod opening into the second region of the bore access opening; and retaining the connecting rod in alignment with the second region of the bore access opening while the valve spool is mounted in spool bore of the valve body by mounting the connecting rod relative to the valve body at a location where an axis of the connecting rod passes through the second region of the bore access opening.

DETAILED DESCRIPTION

The present disclosure relates to a manual override assembly. The manual override assembly can be installed on a hydraulic power source or another system in need of manual override capability, such as a system having an electronically controlled valve system.

Figure 1:
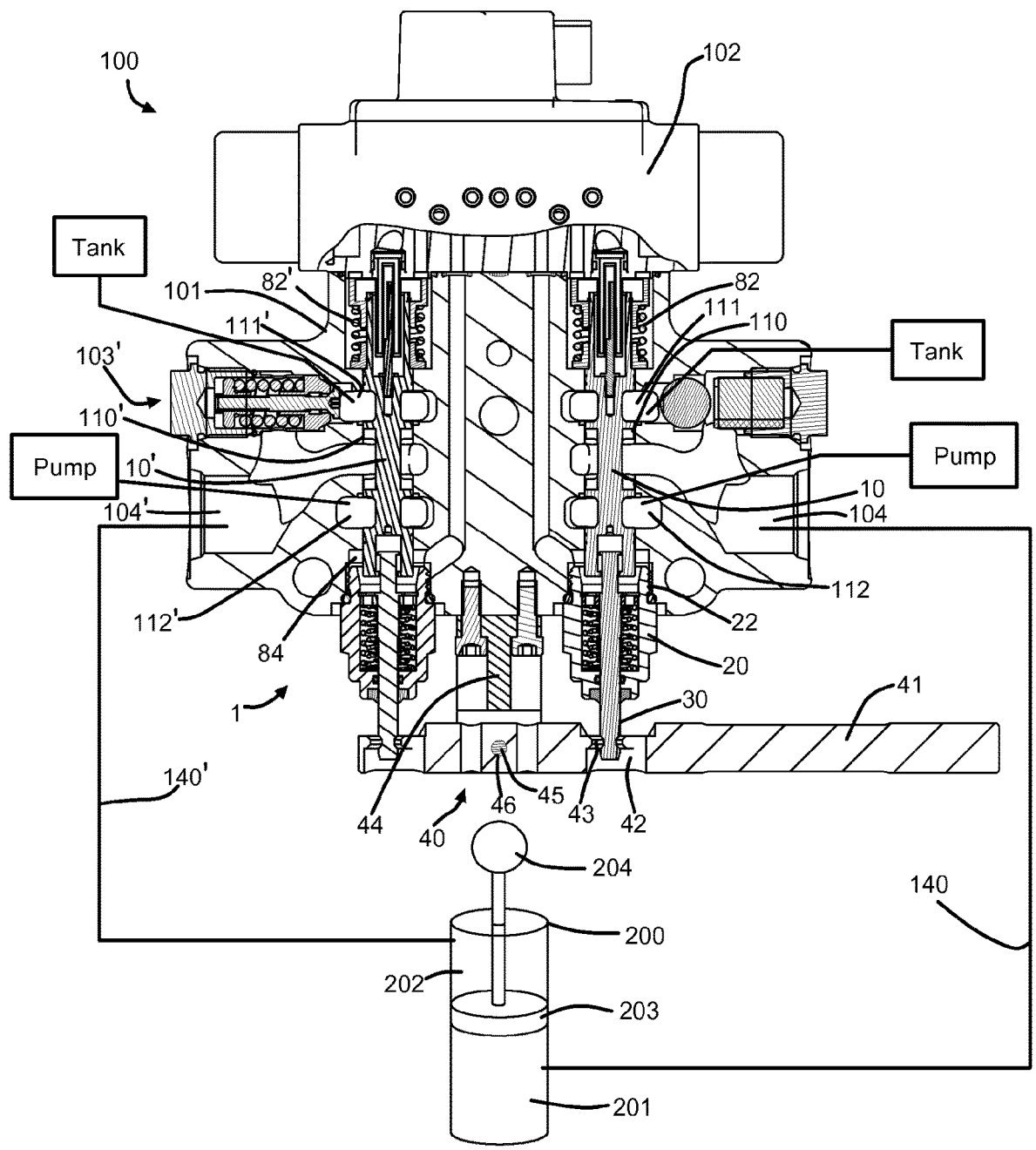
FIG. 1 shows a cross sectional view of a hydraulic power source with a manual override assembly according to an example of the present disclosure.
Figure 4A:
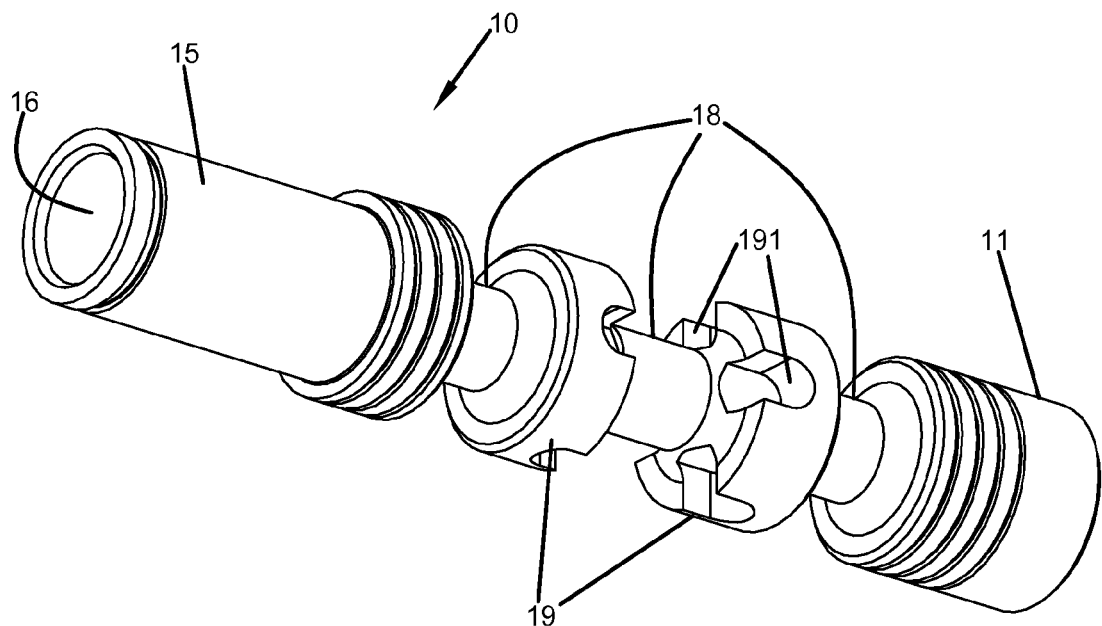
FIG. 4A shows a perspective view of a spool of the manual override assembly of FIG. 1.
Figure 4B:
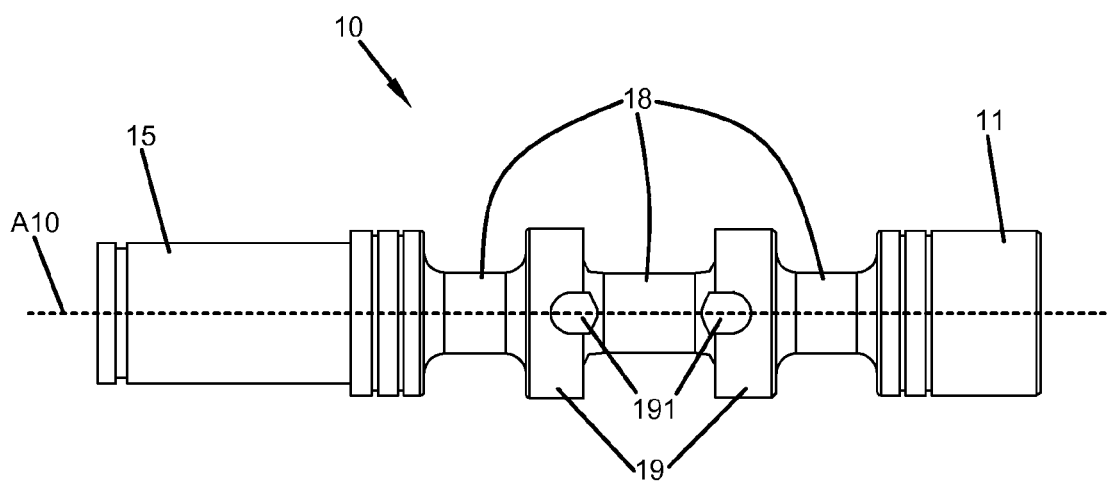
FIG. 4B shows a side view of the spool of FIG. 4A.
Figure 4C:
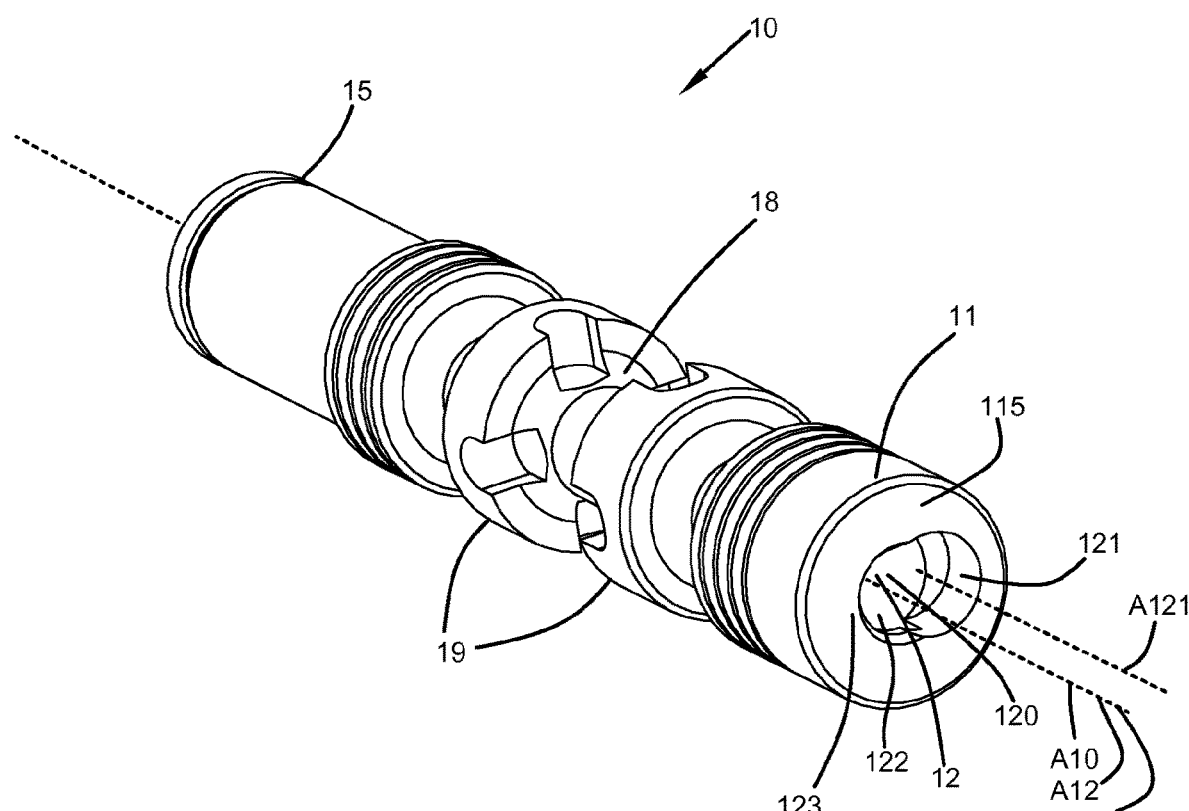
FIG. 4C shows a perspective view of the spool of FIG. 4A.
Figure 4D:
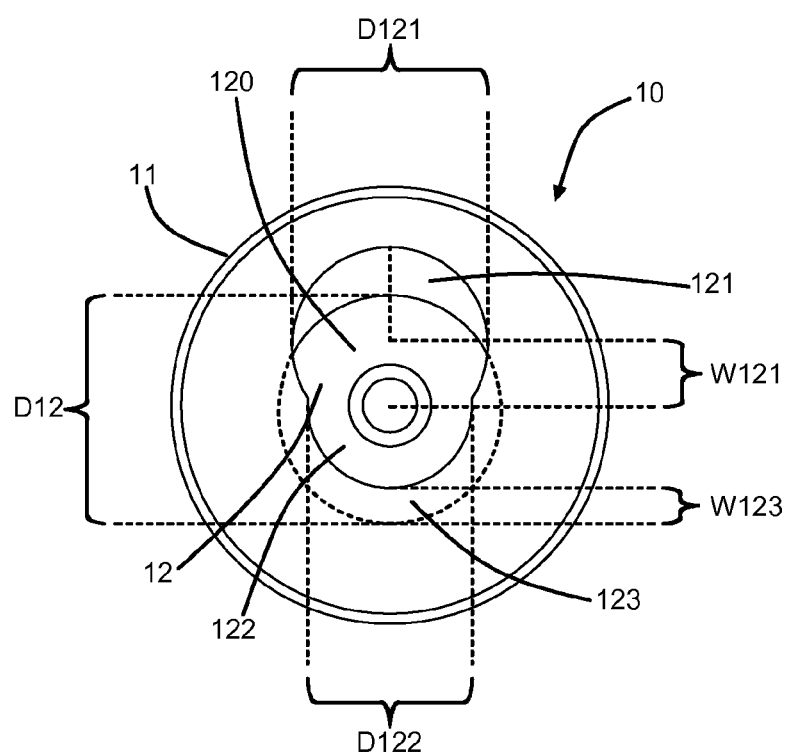
FIG. 4D shows a bottom view of the spool of FIG. 4A.
Figure 4E:
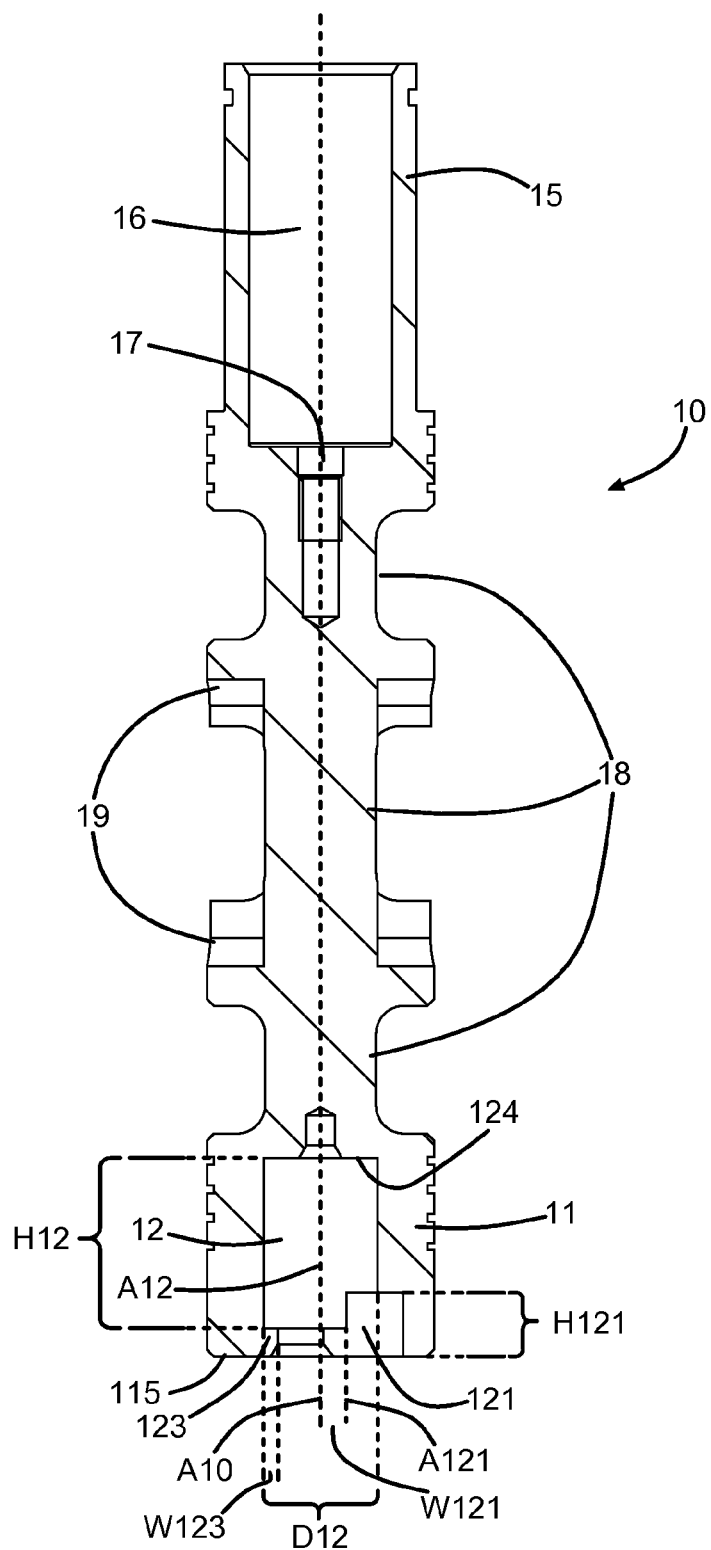
FIG. 4E shows a cross sectional view of the spool of FIG. 4A.
Figure 4F:
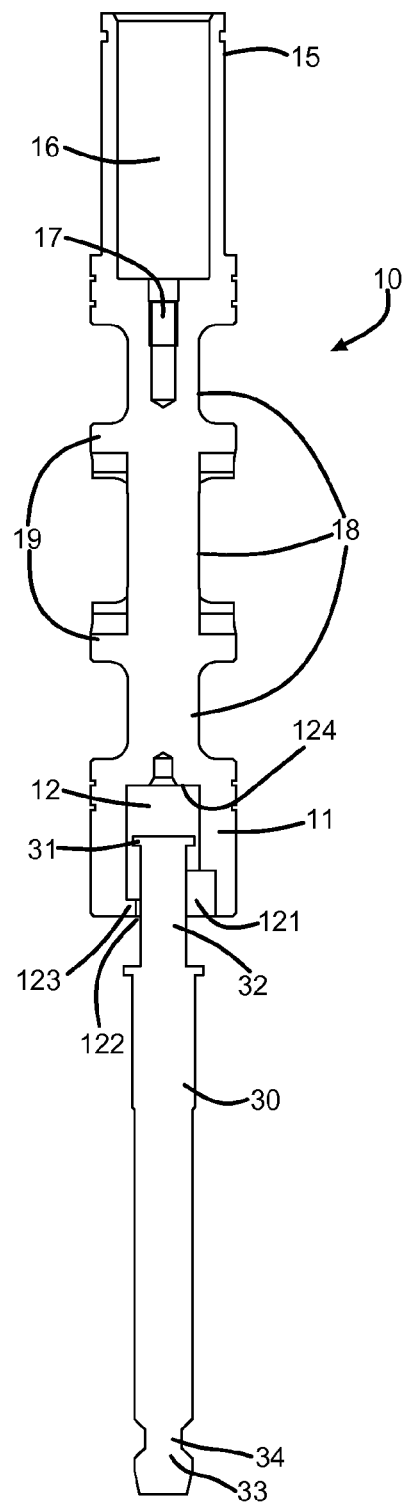
FIG. 4F shows a cross sectional view of the spool of FIG. 4A with a connecting rod.

FIG. 1 shows an example of a hydraulic power source 100 with a manual override assembly 1 according to the present disclosure. During normal operation the hydraulic power source 100 is operated by a powered actuator 102 (e.g., a pilot valve, a solenoid arrangement, a voice coil arrangement, etc.). The hydraulic power source 100 comprises a valve body 101 defining a first spool bore 110 and a second spool bore 110'. The hydraulic power source 100 includes work ports 104, 104'. Hydraulic fluid flow through work ports 104, 104' is controlled by two spools 10 (shown as a first spool 10 and second spool 10') disposed in spool bores 110, 110'. In one example, the powered actuator 102 selectively directs hydraulic fluid under pilot pressure to chambers 81, 81', 84, or 84' that causes upward or downward movement of the spools 10, 10'. Movement of the spools 10, 10' provides alternating fluid communication between a high pressure gallery 112, 112' and the work ports 104, 104', and between the work ports 104, 104' and a low pressure gallery 111, 111'. The terms "up," "upward," "down," and "downward" are used here indicating directions relative to a longitudinal spool axis A10 (see FIG. 4E) when the spools are in a vertical position, but the hydraulic power source 100 and the manual override assembly 1 could, of course, exist in any directional position in the three-dimensional space.

The high pressure galleries 112, 112' connect to a high pressure side of a pump that provides system pressure to the high pressure galleries 112, 112'. Conventional load control technology can be used to control the system pressure provided to the high pressure galleries 112, 112' by the pump. The low pressure galleries 111, 111' connect to a tank or reservoir at tank pressure.

According to the present disclosure, the spools 10, 10' function as three-position spool valves that can be in a neutral position (shown in FIG. 1), an upper position, or a lower position. Springs 82, 82' bias the spools 10, 10' into the neutral position when the spools 10, 10' are not actuated by the actuator 102 or the manual override assembly 1. When a spool (e.g., either of the spools 10, 10') is actuated into the lower position, a flow path from the pump and the high pressure gallery 112 to the work port 104 is created. When a spool (either of the spools 10, 10') is actuated into the upper position, a flow path through the work port 104 and the low pressure gallery 111 to the tank is created.

In a first phase of operation the actuator 102 controls the first spool 10 to move downward as the second spool 10' simultaneously moves upward. When the first spool 10 moves down by an operating distance to the lower position, a flow path (e.g., a path defined by a groove of the spool 10) between the high pressure gallery 112 and the work port 104 is created, allowing flow of hydraulic fluid from the high pressure gallery 112, through the work port 104 and line 140, into the first chamber 201 of a work component 200 (e.g., hydraulic cylinder), according to one example. The increased pressure and fluid volume in the first chamber 201 causes a movement of a piston 203, further causing flow of hydraulic fluid from the second chamber 202 through line 140', into the second work port 104'. The upward movement of the second spool 10' to the upper position creates a flow path (e.g., defined by a groove of the spool 10') between the second work port 104' and the low pressure gallery 111', allowing the hydraulic fluid to flow from the work port into tank. In a second phase of operation the flow is reversed as the second spool 10' moves to the lower position and the first spool 10 moves to the upper position.

Figure 2A:
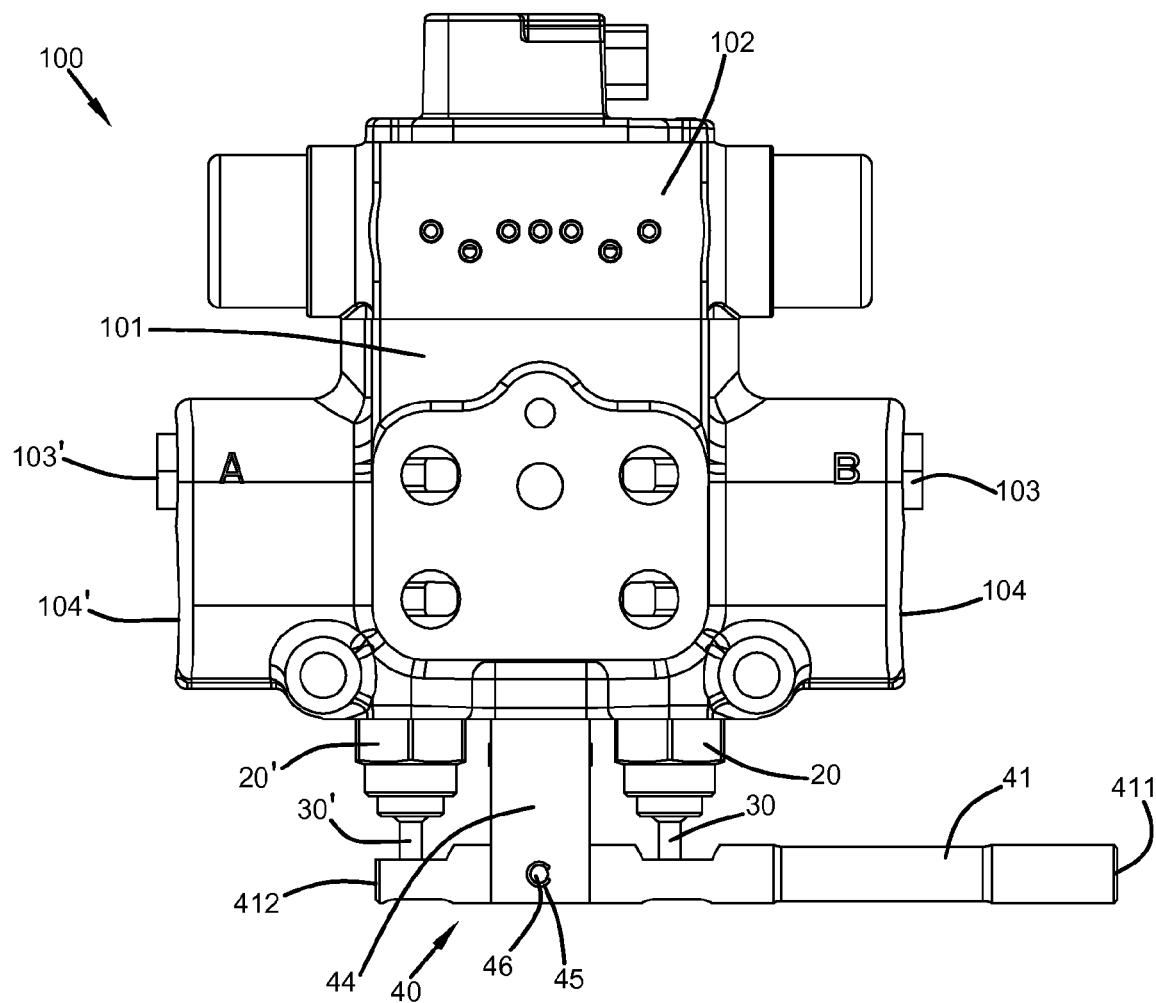
FIG. 2A shows the manual override assembly of the hydraulic power source of FIG. 1 in a neutral position.
Figure 2B:
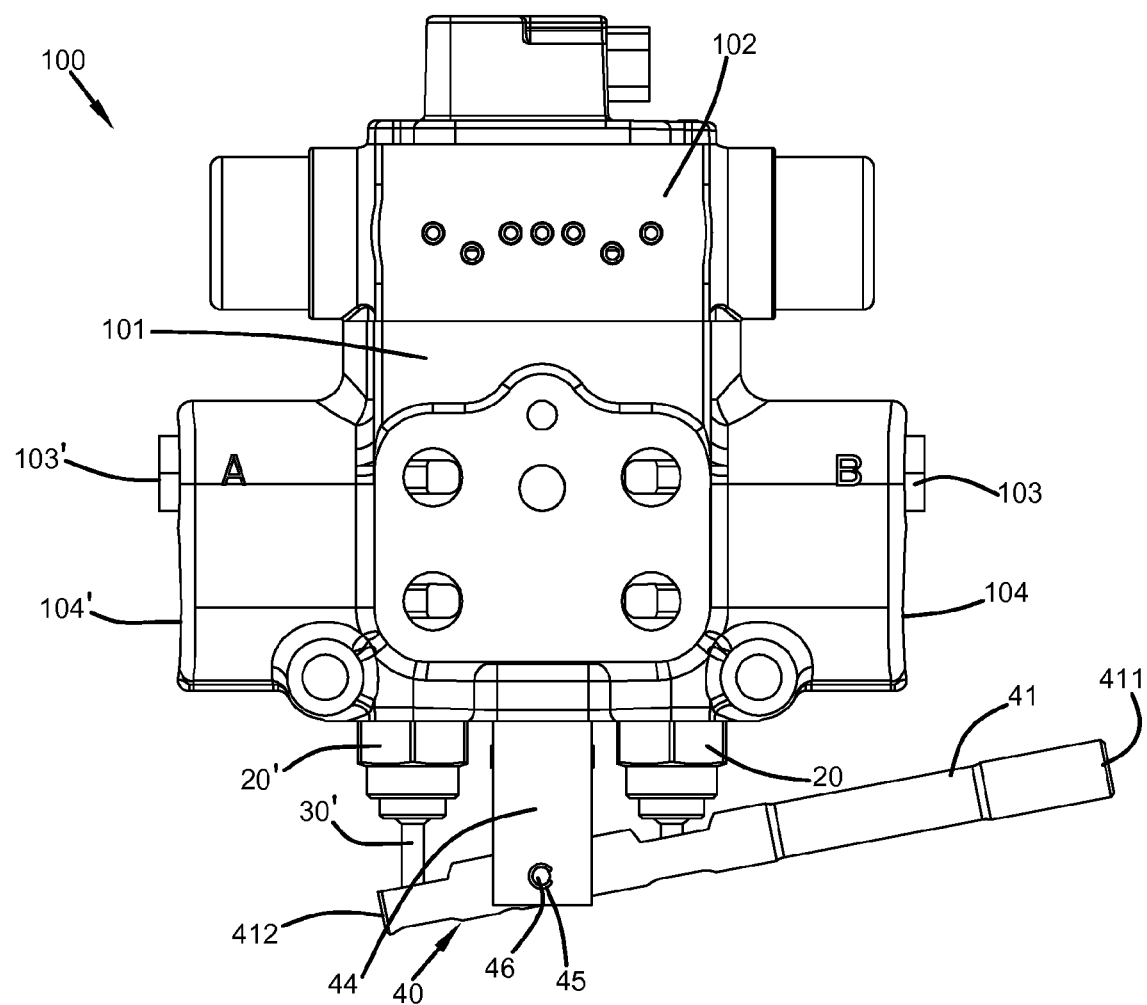
FIG. 2B shows the manual override assembly of the hydraulic power source of FIG. 1 in a first override position.
Figure 2C:
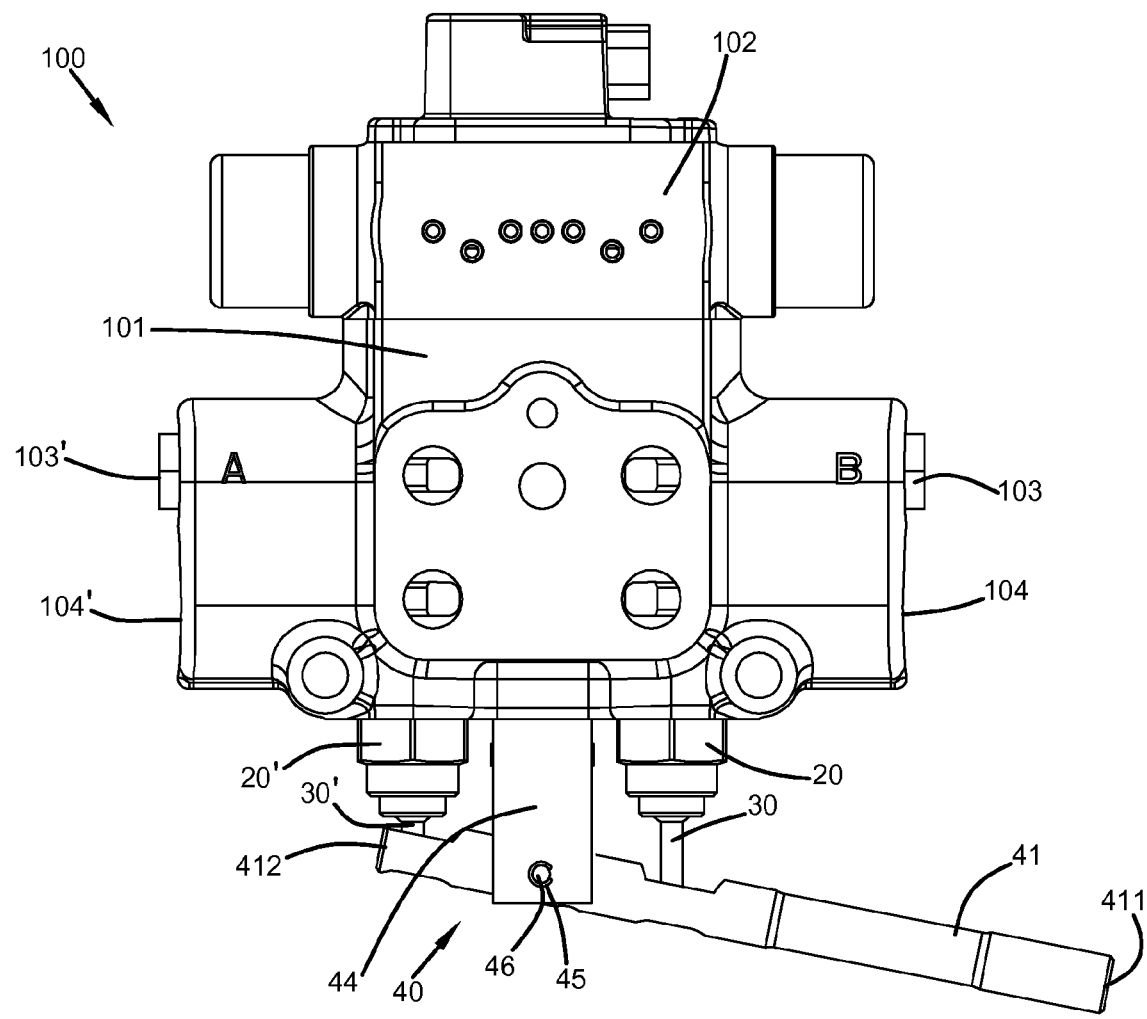
FIG. 2C shows the manual override assembly of the hydraulic power source of FIG. 1 in a second override position.

Occasionally it may be desirable to operate the hydraulic power source 100 manually using a manual override assembly 1. The manual override assembly 1 mechanically interfaces with the spools 10, 10' and includes: two retainer plug assemblies 20, connecting rods 30, and a lever assembly 40. In manual operation as shown in FIGS. 2A-2C, the lever 41 can be manually pivoted up or down, to manually adjust the positions of the spools 10, 10' via the connecting rods 30, 30'. FIG. 2A shows the lever 41 in a neutral resting position (e.g., in a horizontal position). The lever 41 is mounted on a valve body 101 of the hydraulic power source 100 by a mounting bracket 44 and a pin 45.

The pin 45 creates a pivot axis 46 for the lever 41 so that when a proximal end 411 (e.g., a handle portion) of the lever 41 is pushed up, as shown in FIG. 2B, the lever 41 pivots counterclockwise around the pin 45, causing a distal end 412 of the lever 41 to move downward. The pivoting movement of the lever 41 causes the first connecting rod 30 to move upward and to engage the first spool 10, pushing the spool 10 upward and opening a flow path between the first work port 104 and the first low pressure gallery 111. The downward movement of the distal end 412 pulls down the second connecting rod 30' coupled with the distal end 412. The second connecting rod 30' in turn engages and pulls down the second spool 10' that the second connecting rod 30' is coupled with, opening a flow path between the high pressure gallery 112' and the second work port 104'.

When the proximal end 411 of the lever 41 is pushed down, as shown in FIG. 2C, the lever 41 pivots clockwise about the pivot pin 45 and pulls down the first connecting rod 30 that is coupled with the lever 41 on the proximal side of the pin 45 and pushes up the second connecting rod 30' on the distal side of the pin 45. As the lever pivots clockwise, the first connecting rod 30 engages and pulls down the first spool 10 toward the lower position and the second connecting rod 30' moves simultaneously upward, engaging and pushing up the second spool 10' toward the upper position. The retainer plug assemblies 20, 20' are mounted on the valve body 101 of the hydraulic power source 100 and remain in a stationary position during operation.

Figure 3A:
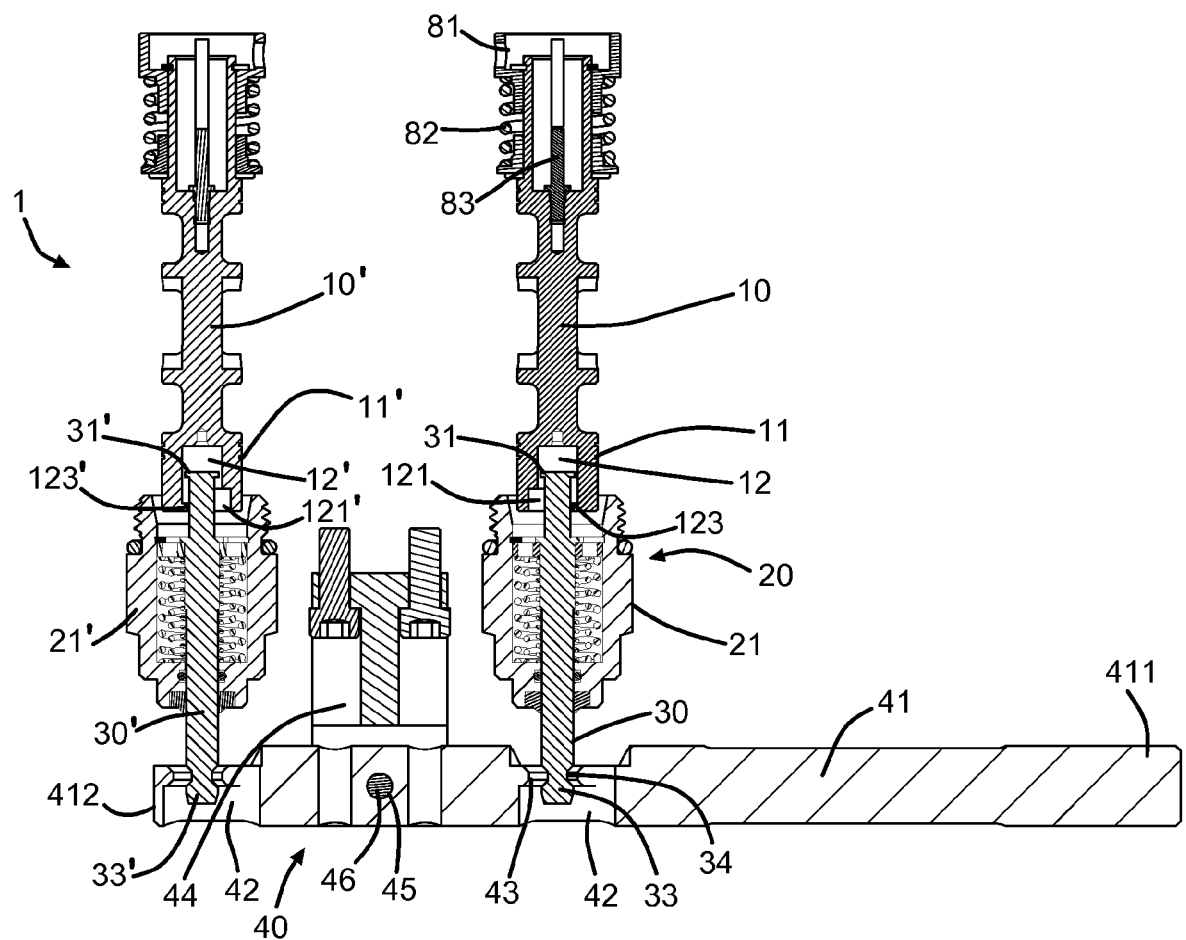
FIG. 3A shows a cross sectional view of the manual override assembly of FIG. 1.
Figure 3B:
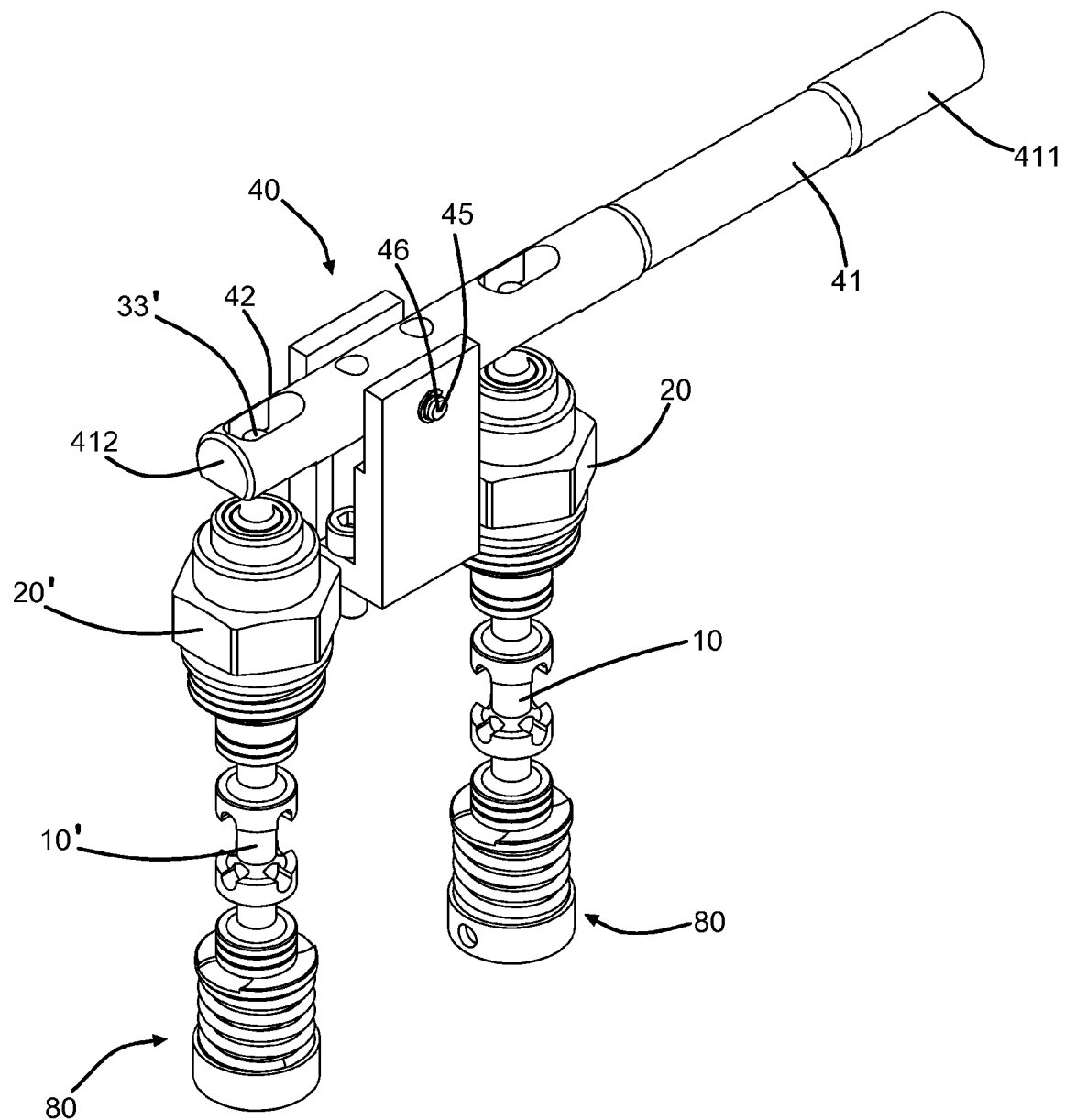
FIG. 3B shows a bottom perspective view of the manual override assembly of FIG. 1.

FIG. 3A shows a cross sectional view of the manual override assembly 1 according to an example of the present disclosure. One end of the connecting rods 30, 30' engages with the spools 10, 10' (respectively), and the other end of the connecting rods 30, 30' couples with the lever 41, connecting the spools 10, 10' to the lever 41. The connecting rods 30, 30' extend through and are axially centered within the retainer plugs 21, 21'. The lever 41 has two openings 42 with a narrowing section 43 that engages a ball end 33, 33' of the connecting rods 30, 30' by a neck 34, 34'. FIG. 3B shows a bottom perspective view of the manual override assembly 1.

FIGS. 4A-4H show various views of the spool 10 according to an example of the present disclosure. The spool 10 comprises a first end 11 and a second end 15 and a plurality of recesses 18 (i.e., grooves) axially disposed along the length of the spool 10. The spacing of the recesses 18 is configured to permit flow between the high pressure gallery 112 and the work port 104, or between the work port 104 and the low pressure gallery 111 when the spool 10 is moved from its neutral resting position by a minimum operating distance MD10. The recesses 18 are separated by rings 19 (also referred to as lands), the diameter of which closely matches the inside diameter of the spool bore 110. The rings 19 may comprise a plurality of recesses 191 circumferentially disposed around the perimeter of the ring 19. When the spool 10 is in a resting position the rings 19 engage with the inside surface of the spool bore 110, preventing flow between the high pressure gallery 112, the low pressure gallery 111, and the work port 104. It will be appreciated that the spool 10' has the same configuration.

Referring now to FIGS. 4C-4G, according to an example of the present disclosure, the spool 10 comprises a longitudinal spool axis A10 and at the first end 11 of the spool 10 a connecting rod bore 12 having a bore axis A12. The connecting rod bore 12 comprises an end opening 120 (i.e., a bore access opening) at an axial end face 115 of the spool 10 with an insertion region 121 for inserting the connecting rod 30 into the connecting rod bore 12, the insertion region 121 having an insertion axis A121, and a retention region 122 through which the connecting rod 30 extends in an assembled position, the retention region 122 having a retention axis A122. The retention axis A122, the spool axis A10, and the bore axis A12 are co-axially aligned with one another, whereas the insertion axis A121 is laterally offset from the spool axis A10 by a distance W121. The first and second connecting rods 30, 30' are loaded into their respective connecting rod bores 12, 12' and thereby coupled with their corresponding first and second spools 10, 10' by inserting the spool engagement flanges 31, 31' axially through the insertion regions 121, 121' of the bore access openings 120, 120' and then sliding the connecting rods 30, 30' laterally into alignment with the retention regions 122, 122' of the bore access openings 120, 120' such that the spool engagement flanges 31, 31' are captured within the spool bores 12, 12' and the connection rods 30, 30' extend through the retention regions 122, 122'.

The retention region 122 of the opening 120 has a cross-dimension including a diameter D122 that is partially defined by a lip 123. The lip 123 is positioned at an opposite end of the opening 120 from the insertion region 121 and has a width W123. The lip 123 operates to retain a retaining element such as a flange 31 of the connecting rod 30 inside the connecting rod bore 12 when the manual override assembly 1 is assembled. The connecting rod bore 12 has a closed end 124 defining a depth H12. Each connecting rod 30, 30' comprises a retention element such as a flange 31, 31' that engages the spool 10, 10' at the lip 123, 123' when the connecting rod 30, 30' is moved downward while the rod 30, 30' is aligned with and passes through the retention region 122, or at the closed end 124, 124' when the connecting rod 30, 30' is moved upward. The flange 31 has a cross dimension D31 (see FIG. 5B). In one example, the flange 31 is annular and the cross dimension D31 is the diameter of the flange 31. The connecting rod bore 12 of the spool 10 has a diameter D12 (see FIG. 4D) that is larger than the cross dimension D31 of the flange 31.

Figure 4G:
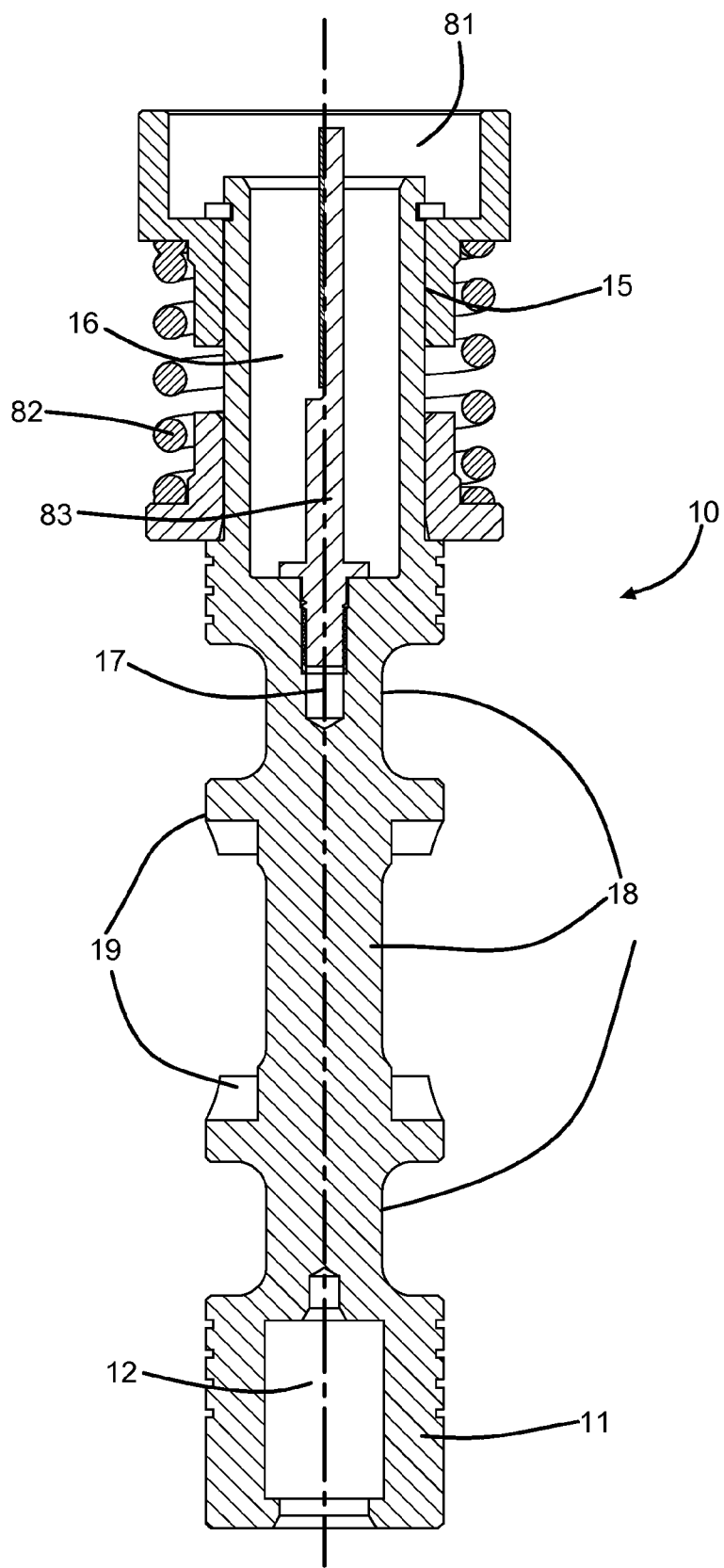
FIG. 4G shows a cross sectional view of the spool of FIG. 4A with a piston assembly.
Figure 4H:
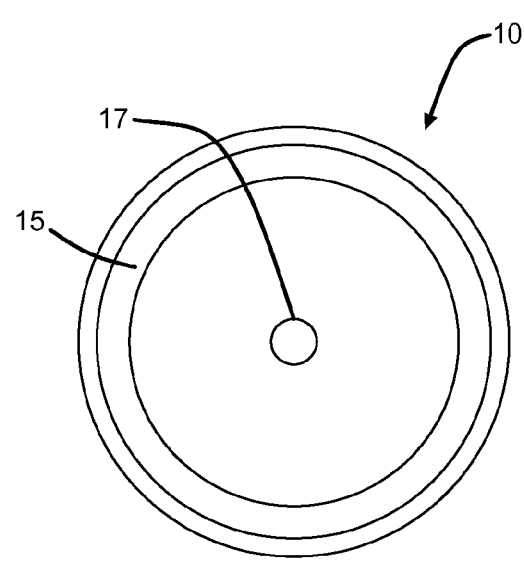
FIG. 4H shows a top view of the spool of FIG. 4A.

FIG. 4G shows a spool 10 coupled with parts of the actuator 102 at the second end 15 of the spool 10. In normal operation the actuator 102 interfaces with a controller that controls the position of the spool 10 in the spool bore 110. A position sensor 83 is used to sense the vertical position of the spool 10. The position sensor 83 is seated in a sensor cavity 17 at the bottom of an opening 16 at the second end 15 of the spool 10. FIG. 4H shows a top view of the spool 10, showing the opening 16 and the sensor cavity 17. In an example, the actuator 102 changes the position of the spool 10 by selectively directing a flow of hydraulic fluid at pilot pressure into a first chamber 81 or a second chamber 84 (shown in FIG. 1). The spring 82 biases the spool 10 into a neutral position. It will be appreciated that position of the spool 10' can be controlled in the same way by the actuator 102.

Figure 5A:
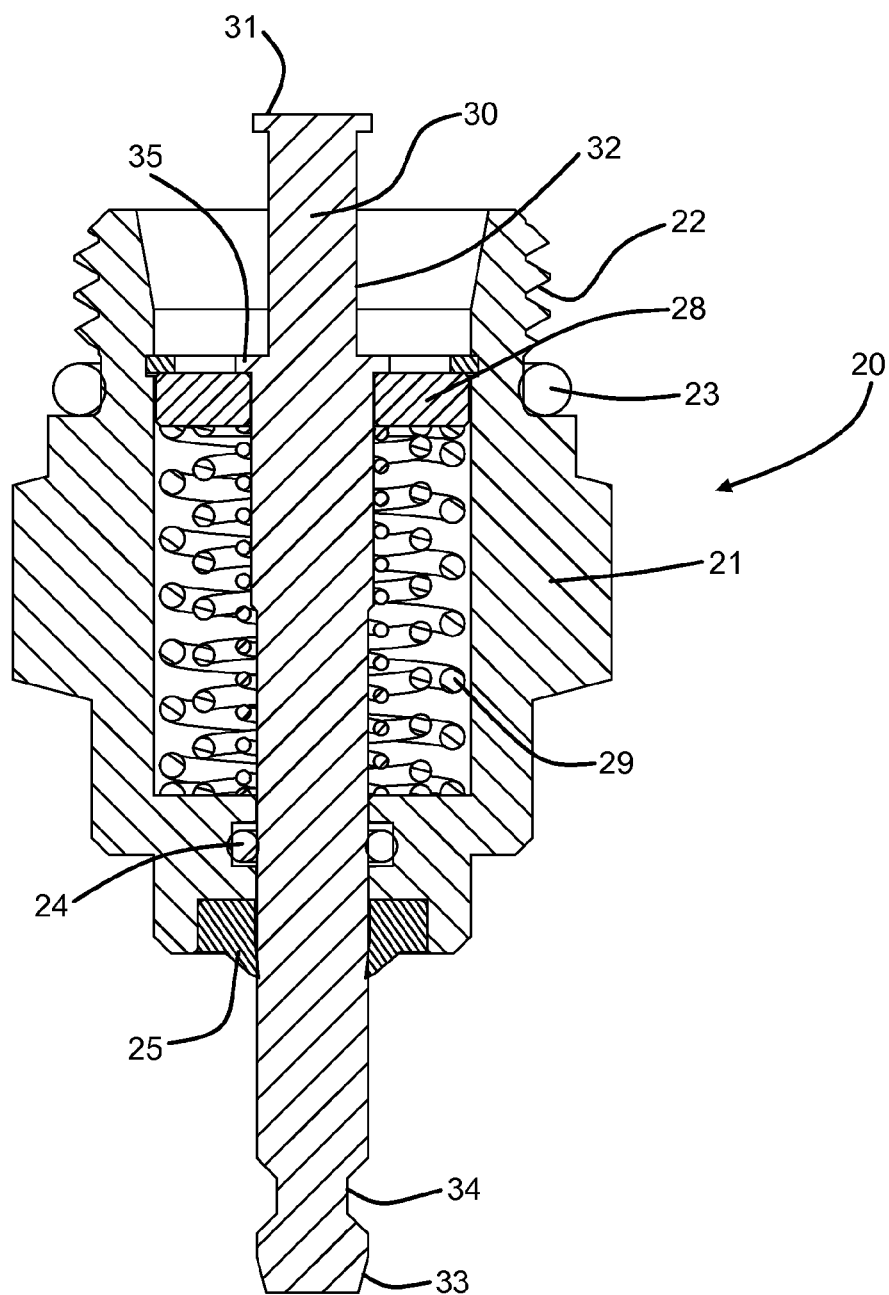
FIG. 5A shows a cross sectional view of a retainer plug assembly of the hydraulic power source of FIG. 1.
Figure 5B:
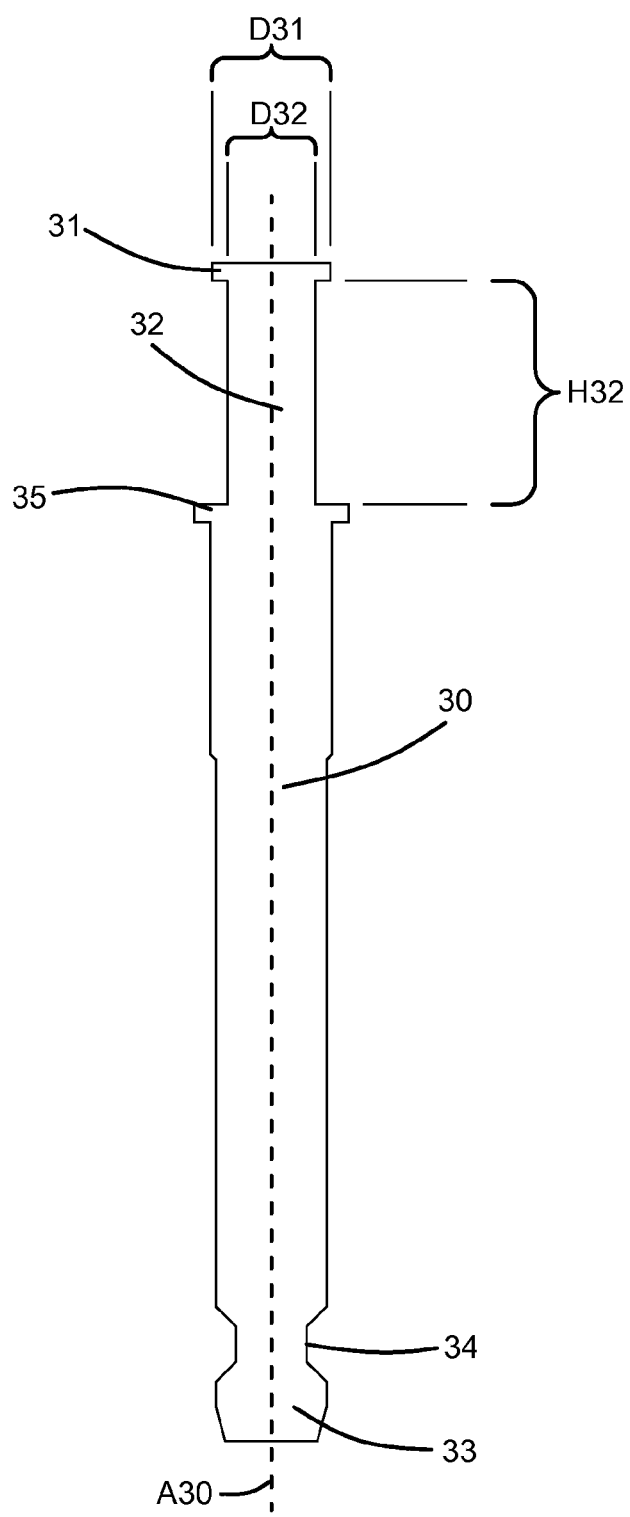
FIG. 5B shows a connecting rod of the hydraulic power source of FIG. 1.
Figure 5C:
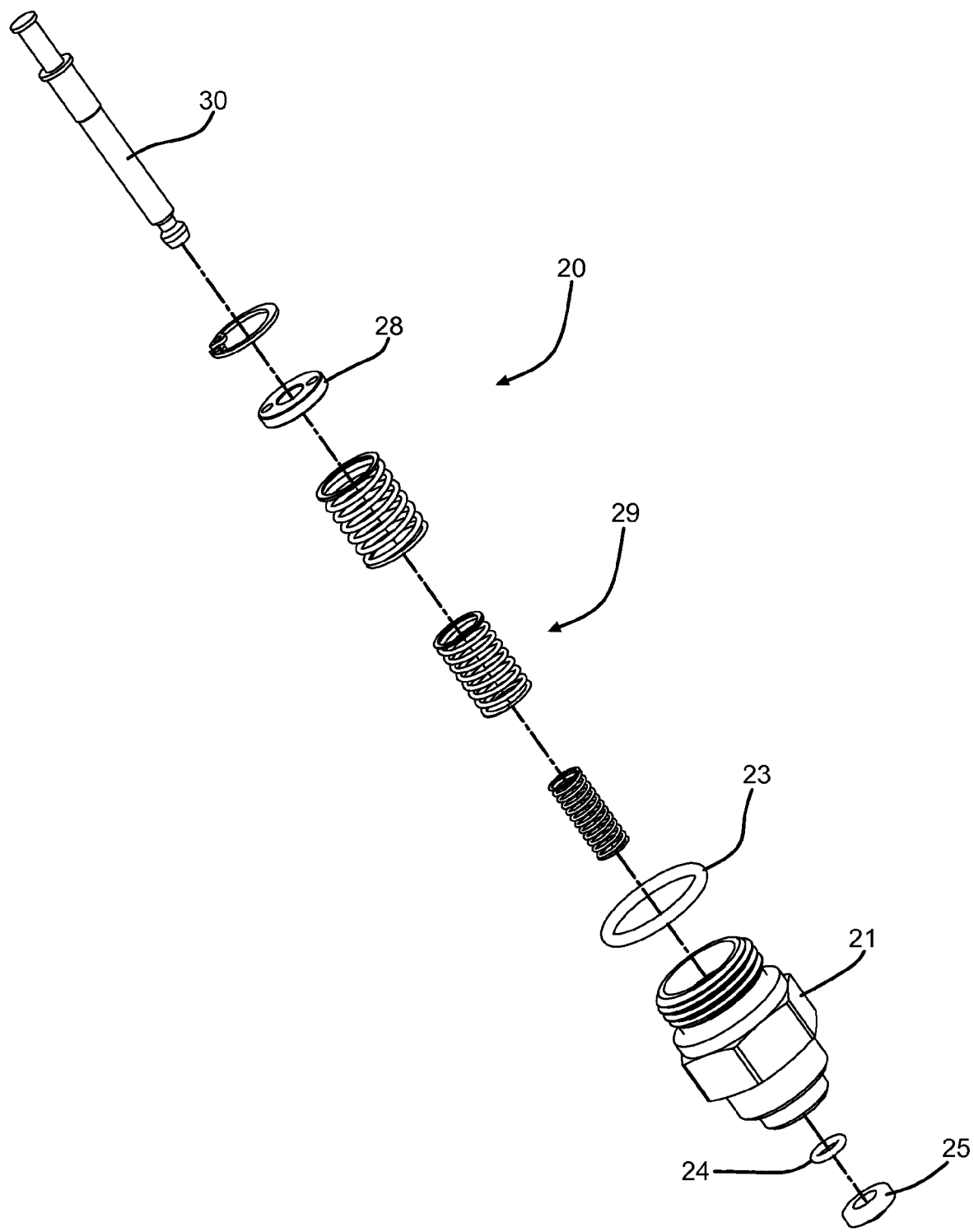
FIG. 5C is an exploded view of the retainer plug assembly and connecting rod of the hydraulic power source of FIG. 1.

FIGS. 5A-5C show the connecting rod 30 and the retainer plug assembly 20 according to an example of the present disclosure. The retainer plug assembly 20 comprises a retainer plug 21 (i.e., a spring housing) having threading 22 that is used to mount the retainer plug assembly 20 to the valve body 101 of the hydraulic power source 100. The retainer plug assembly 20 further comprises seals 23, 24, and a dirt wiper ring 25. When the retainer plug assembly 20 and the connecting rod 30 are assembled together, the dirt wiper ring 25 is positioned around the connecting rod 30 and prevents dirt and debris from getting into the retainer plug assembly 20 and further into the spool bore 110 where they could cause excessive wear. The retainer plug assembly 20 comprises a stopper 28 (e.g., a washer) separating a stop collar 35 (i.e., a spring compression flange) of the connecting rod 30 from a spring assembly 29 disposed inside the retainer plug 21. The spring assembly 29 engages the connecting rod 30 via the stop collar 35 and the stopper 28 and biases the connecting rod 30 to a neutral position. A retainer such as a snap ring retains the spring assembly 29 and the stopper 28 in the retainer plug 21 and defines a stop location that corresponds to the neutral position of the manual override 1. The spring assembly 29 may comprise one or more springs (e.g., three coil springs as shown in the FIGURES, where each of the springs have a different diameter and springs fit inside one another). Using a plurality of interfitting springs enables the use of a shorter retainer plug 21.

A threaded port in the valve body 101 receives the retainer plug 21 (see FIG. 1). The threaded port is co-axially aligned with the corresponding spool bore and spool. When mounted in the threaded port with the connecting rod 30 supported therein, the retainer plug assembly 20 maintains the axis A30 of the connecting rod 30 in co-axial alignment with the spool bore, the connecting rod bore 12 and the retention axis A122 of the retention portion 122 of the end opening 120 of the spool 10. Thus, when the override assembly 1 is assembled, the retainer plug assembly 20 prevents the connecting rod 30 from moving laterally relative to the spool 10 from the retention portion 122 to the insertion portion 121. In this way, once the override assembly is assembled, the connecting rod 30 will not inadvertently de-couple from its corresponding spool 10.

Figure 6A:
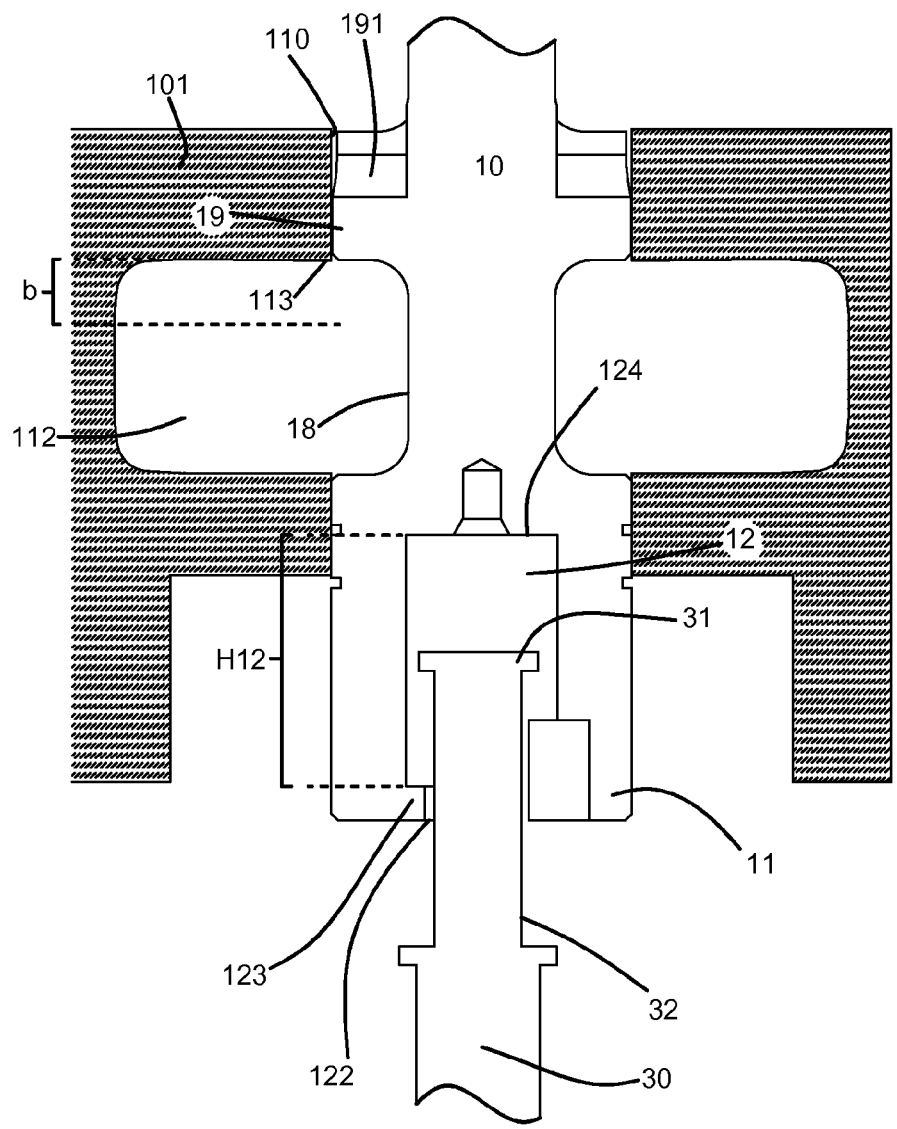
FIG. 6A shows a partial cross sectional view of the spool and connecting rod of the hydraulic power source of FIG. 1.

During normal operation when the spools 10, 10' are actuated by the actuator 102 and when the lever 41 is in a neutral position, the actuator 102 imparts a limited/controlled range of motion to the spools 10, 10'. FIG. 6A shows a close-up view of the lower end of the spool 10 positioned in the spool bore 110 and the upper end of the connecting rod 30. When the system is in a neutral position, the flange 31 is axially centered in the connecting rod bore 12. In order to create a flow path between the high pressure gallery 112 and the work port 104, the spool 10 is moved down a distance b so that the ring 19 (or the recess 191) clears the edge 113 of the spool bore 110. Similarly, in order to create a flow path between the work port 104 and the low pressure gallery 111, the spool 10 is moved up by a distance a. The range of motion of the spool 10 imparted by the actuator 102 is a+b. In one example a+b is the maximum axial displacement of the spool 10 permitted by the actuator 102. The depth H12 of the connecting rod bore 12 defines the maximum axial distance the spool 10 can move relative to the connecting rod 30. The depth H12 is configured to be greater than the range of motion (a+b) of the spool 10 so that, in normal operation, when the spool 10 is moved by the actuator, the flange 31 does not come into contact with the spool 10 either at the lip 123 or at the closed end 124. This configuration avoids movement of the connecting rods 30, 30' or the lever 41 as the spools 10, 10' are moved up or down by the actuator.

Figure 6B:
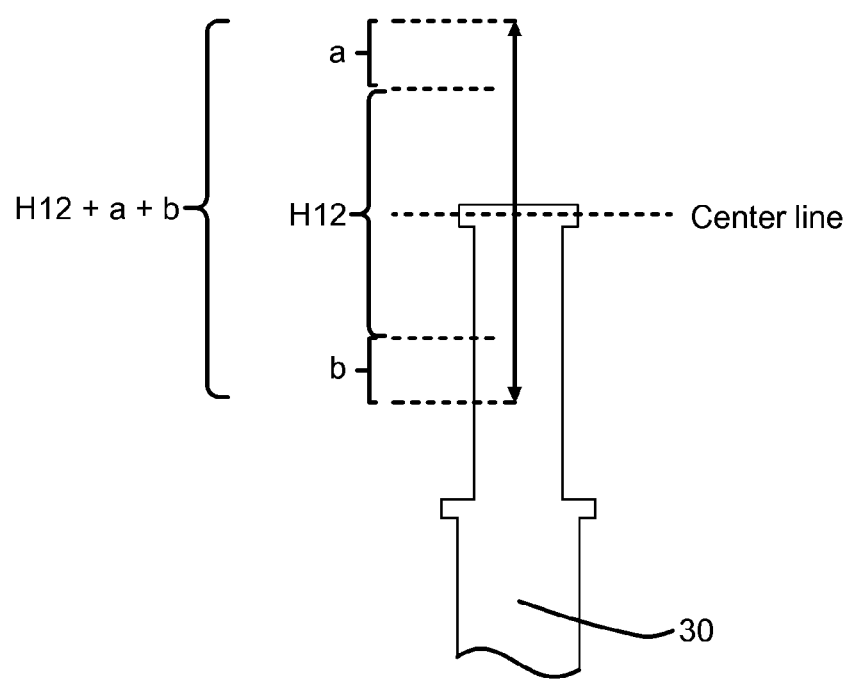
FIG. 6B shows a partial cross sectional view of the connecting rod of the hydraulic power source of FIG. 1.

During manual operation the connecting rod 30 moves downward and the flange 31 engages the lip 123 to impart a downward motion to the spool 10, and when the connecting 30 moves upward, the flange 31 engages the closed end 124 to impart an upward motion to the spool 10. As shown in FIG. 6B, the range of axial movement provided to the connection rods 30, 30' by the lever 41 is greater than the distance H12 between the lips 123, 123' and the closed ends 124, 124'. In one example the range of motion of the connecting rods 30, 30' is H12+a+b.

According to an example, the spool 10 has a one-piece construction and can be machined from a single block of metal, thus saving in manufacturing costs and simplifying assembly. According to another example, the combination of the spool 10 and the retainer plug 21 of the present disclosure enables a more compact design while preventing movement of the lever 41 when the hydraulic power source 100 is in normal operation. The present design may also provide a more durable system with fewer leaks.

Figure 7:
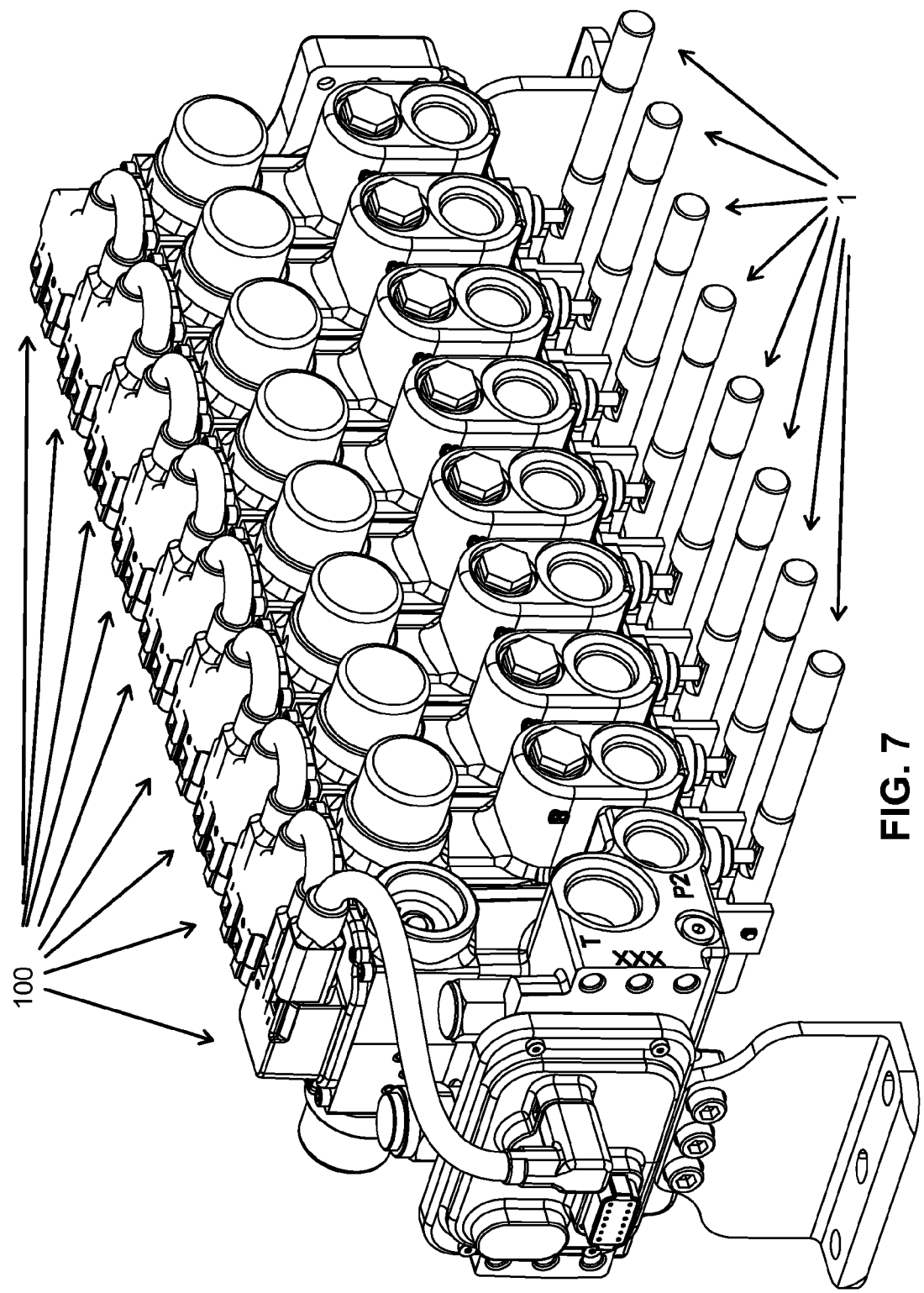
FIG. 7 shows a perspective view of a manifold of hydraulic power sources of FIG. 1.

Multiple hydraulic power sources 100 with manual override systems 1 can be assembled on a manifold, as shown in FIG. 7, such that the high pressure galleries 112 of the hydraulic power sources 100 are in fluid communication and are fed by a single high pressure source, and the low pressure galleries 111 feed into a single fluid outlet (e.g., a tank).

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:
1. A spool valve connection arrangement comprising:
 a connecting rod including a rod retention element adjacent a first end of the connecting rod; and
 a valve spool defining a spool axis and including lands and at least one recess between the lands, the valve spool also defining an internal connecting rod bore positioned adjacent one end of the valve spool, the valve spool further including an axial end face at the end of the valve spool, the axial end face defining a bore access opening having a cross-sectional profile perpendicular to the spool axis that is fully enclosed when viewed from the axial end face, the bore access opening including a first region and a second region, the first region and the second region being positioned along the same plane as the axial end face perpendicular to the spool axis, the second region being laterally offset perpendicular to the spool axis from the first region, the second region of the bore access opening being co-extensive with the connecting rod bore and the first region being at least partially laterally offset from the connecting rod bore, the first region of the bore access opening being sized and shaped to allow the first end of the connecting rod including the rod retention element to be inserted therethrough parallel to the spool axis, the second region of the bore access opening being sized and shaped to prevent the first end of the connecting rod including the retention element from being axially withdrawn from the connecting rod bore, wherein the connecting rod is coupled to the end of the spool by inserting the first end of the connecting rod including the rod retention element through the first region of the bore access opening and then moving the connecting rod perpendicularly to the spool axis from the first region of the bore access opening into the second region of the bore access opening.

2. The spool valve connection arrangement of claim 1, wherein the second region of the bore access opening includes a lip that opposes the rod retention element to prevent the connecting rod from being axially removed from the connecting rod bore when the connecting rod is positioned to extend through the second region of the bore access opening.

3. The spool valve connection arrangement of claim 2, wherein the first end of the connecting rod is captured within the connecting rod bore and wherein a limited first range of axial movement is permitted between the spool and the connecting rod.

4. The spool valve connection arrangement of claim 3, wherein the connecting rod is connected to a manual actuator for manually adjusting an axial position of the spool within a spool bore defined by a valve body.

5. The spool valve connection arrangement of claim 4, further comprising a powered actuator for axially moving the spool within the spool bore, wherein when the manual actuator is in a neutral position, movement of the spool by the powered actuator does not cause movement of the connecting rod.

6. The spool valve connection arrangement of claim 4, wherein the manual actuator can move the connecting rod axially though a second range of movement that is longer than the first range of axial movement.

7. A method for coupling a connecting rod to a valve spool defining a spool axis, the connecting rod including a rod retention element adjacent a first end of the connecting rod, the valve spool including lands and at least one recess between the lands, the valve spool also defining an internal connecting rod bore positioned adjacent one end of the valve spool, the valve spool further including an axial end face at the end of the valve spool, the axial end face defining a bore access opening having a cross-sectional profile perpendicular to the spool axis that is fully enclosed when viewed from the axial end face, the bore access opening including a first region and a second region, the first region and the second region being positioned along the same plane as the axial end face perpendicular to the spool axis, the second region being laterally offset perpendicular to the spool axis from the first region, the first region of the bore access opening being sized and shaped to allow the first end of the connecting rod including the rod retention element to be inserted therethrough parallel to the spool axis, the second region of the bore access opening being sized and shaped to prevent the first end of the connecting rod including the retention element from being withdrawn from the connecting rod bore, the valve spool mounting within a spool bore of a valve body, the method comprising:

inserting, in a direction parallel to the spool axis, the first end of the connecting rod including the rod retention element through the first region of the bore access opening;

moving, in a direction perpendicular to the spool axis, the connecting rod from the first region of the bore access opening into the second region of the bore access opening; and retaining the connecting rod in alignment, parallel to the spool axis, with the second region of the bore access opening while the valve spool is mounted in the spool bore of the valve body by mounting the connecting rod relative to the valve body at a location where an axis of the connecting rod passes through the second region of the bore access opening.

\* \* \* \* \*